July 25, 1933.  G. LANE  1,919,735
APPARATUS FOR MAKING ANIMATED PICTURES
Filed July 25, 1930  4 Sheets-Sheet 1

INVENTOR
GEORGE LANE
BY
ATTORNEYS

Patented July 25, 1933

1,919,735

UNITED STATES PATENT OFFICE

GEORGE LANE, OF NEW HAVEN, CONNECTICUT, ASSIGNOR TO AUDIO CINEMA INCORPORATED, OF LONG ISLAND CITY, NEW YORK, A CORPORATION OF NEW YORK

APPARATUS FOR MAKING ANIMATED PICTURES

Application filed July 25, 1930. Serial No. 470,658.

This invention relates to an apparatus for the production of motion pictures known as "animated" pictures. In the production of a projection film for such pictures a series of pictures, executed upon a large number of sheets, are placed in proper sequence upon a support disposed in a fixed relation to a camera, and photographed. More particularly, the present invention relates to an improved platen device for supporting the sheets as the pictures thereon are photographed.

Important objects of the invention are, to improve the photographic quality of an animated picture film; to facilitate the performance of the numerous photographing operations; to provide an improved platen device designed for more complete flattening of the picture sheets upon their support and thereby prevent reflection and picture distortion which would mar the photography; to provide such a platen device designed for easy and quick operation; to provide a platen device designed for convenient manipulation and photographing of long panorama sheets extending beyond the limits of the picture support, and to provide, in a platen device, other improved features of design which will be described hereinafter.

The platen device is illustrated as mounted within a camera stand comprising a rigid frame structure F which supports a table T and a camera C in fixed vertically spaced relation, with the camera lens directed downward toward the table. At opposite sides of the camera the frame supports two lighting units L. The latter are disposed obliquely to direct their rays downward and inward toward the platen device. In the present instance the platen device is a unit mounted upon the table T and adjustable thereon to bring it into proper relation to the camera lens.

The structure of the platen device includes a flat, rectangular wooden base 1 which rests upon the table T. Mounted upon said base is a casting 2 defining a central frame 3 and a flat, plate-like portion surrounding the frame and bearing upon the base 1. Frame 3 defines a rectangular opening which registers with larger openings 4 and 5 formed in the base 1 and table T respectively. At its under face the casting is formed with a depending rib or flange 6 extending around the margin of frame 3 and projecting through the openings 4 and 5. This rib defines an under frame enclosing the supporting means for the platen. The platen comprises a flat, metal plate 7 having a flat smooth upper face, and a flat, compressible rubber pad 8 resting upon said face. Said plate and pad are rectangular or substantially so, and fit in the opening defined by frame 3. Formed upon the depending rib 6 are four ears 9 which project inward beneath the corners of plate 7. Four headed screws 10 are screwed upward through said ears to contact the under side of the plate and form adjustable supporting posts for it. Thereby, the plate is supported for adjustment to bring the platen pad 8 into proper relation to a presser plate to be described hereinafter. Each screw is provided with a check nut to retain an adjustment. At its under side the plate 7 is formed with a central boss 11 and with reinforcing ribs radiating from the boss. Extending across the under side of the plate is a springy metal retaining strip 12 whose ends bear upwardly against the casting at opposite sides of the frame aperture and whose center is apertured to receive a headed screw 13 which is screwed into the boss 11. Thereby the plate 7 is held upon the supporting screws but the yield of the retaining strip permits adjustment of the plate.

Picture sheets are pressed and flattened against the platen pad 8 by a transparent glass presser plate 14 and, at the rear of the platen, there is a hinge mounting adapting the plate to swing to and from the platen. To form this mounting the flat portion of casting 2 is provided with two integral extensions forming flat seats 15 for two shaft-supporting blocks 16. The seats 15 are disposed rearwardly of the frame 3 and spaced laterally outward from the rear corners thereof. Each block 16 comprises a base plate formed with two upstanding ears having alining shaft-receiving bores. Fitted in said bores is a strong, stiff shaft 17. Four bolts 18 are passed downward through each block and are screwed into threaded apertures in the seat to hold the block firmly in place. Each block also has two manually adjustable taper pins 19 formed to fit in tapered holes in the block and into correspondingly tapered holes 20 formed in the block seat 15. Another manually adjustable taper pin 21 is formed to fit in a tapered hole in the block and into a correspondingly tapered hole 22 in the shaft 17. Thereby the blocks 16 and shaft 17 are accurately positioned and rigidly held.

The presser plate 14 is hinged to the shaft 17 through an outer frame 23 supporting the plate. Said frame is formed mainly by a flat, strong metal strip formed into a U-shape. The ends of said strip terminate adjacent the shaft and have rearwardly projecting extension plates 24 fixed to them and apertures to rotatably fit the shaft and hinge the frame thereto. Within frame 23 is a rectangular face with a countersunk seat for the edge margins of the glass plate and the latter is detachably held in place by clips 26. Between frame 23 and frame 25 there is an intermediate pivotal connection supporting frame 25 and the presser plate for limited rocking movement in frame 23. Said pivotal connection comprises a pair of transversely alining headed screws 27 passed inward through bearing apertures in the opposite sides of frame 23, screwed into frame 25, and held by set screws. Screws 27 are located midway between the front and rear edges of frame 25 and form trunions supporting said frame for rocking about a medial axis parallel to the shaft 17. Rocking movement of the frame is limited by a stop pin 28 which projects inward from frame 23 into a short vertical slot in the forward edge of frame 25.

Figures 7, 8, 9, 10:
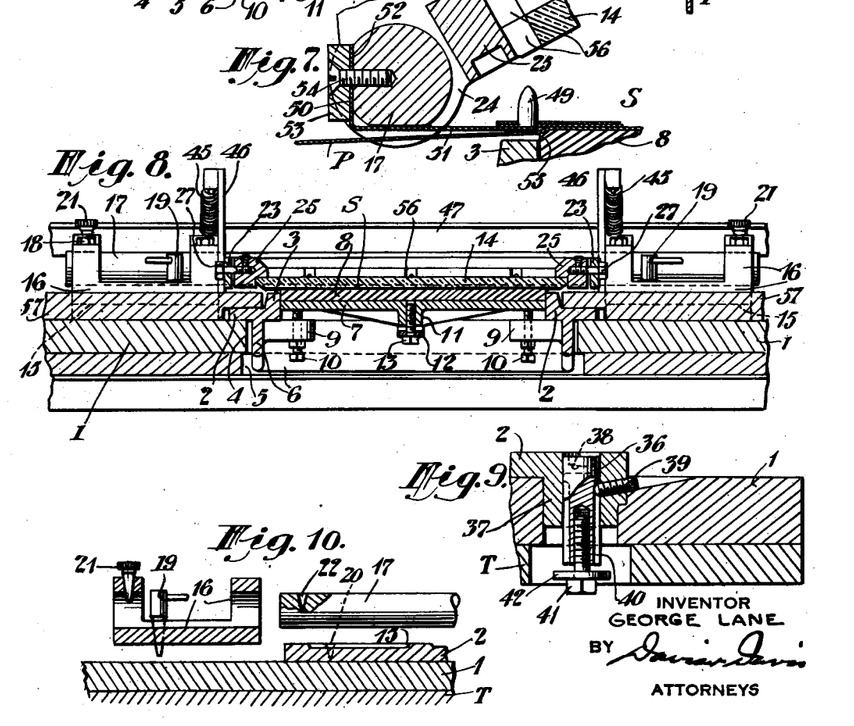
Fig. 7 a view similar to Fig. 5 with the presser plate lifted.
Fig. 8 a transverse vertical section taken on the line 8—8 of Fig. 4.
Fig. 9 a detail sectional view of one of the clamping pins and its mounting.
Fig. 10 a detail sectional view illustrating the removal of one of the supports for the hinge shaft of the presser plate.
Figure 11:
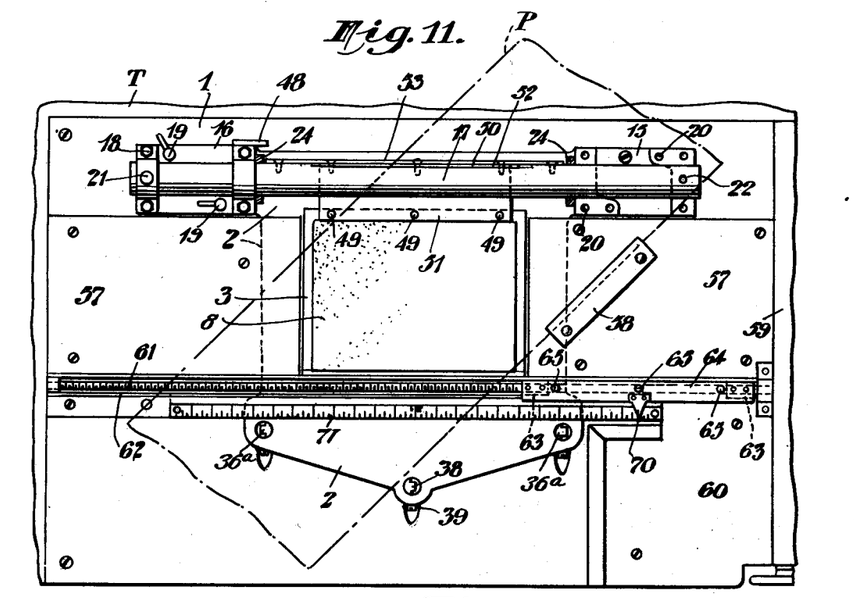
Figs. 11 and 12 plan views, partly broken away showing two adjustments of the platen device for accommodating long panorama sheets.
Figure 12:
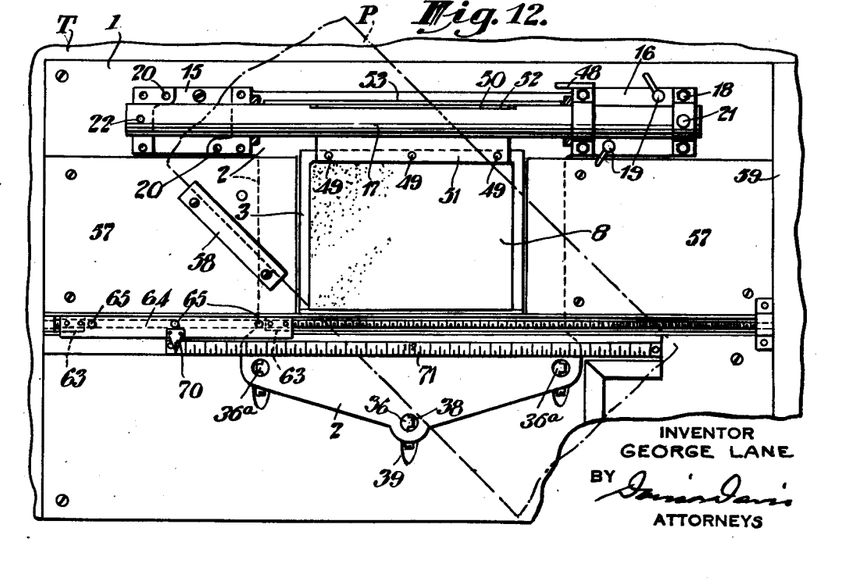
Figure 13:
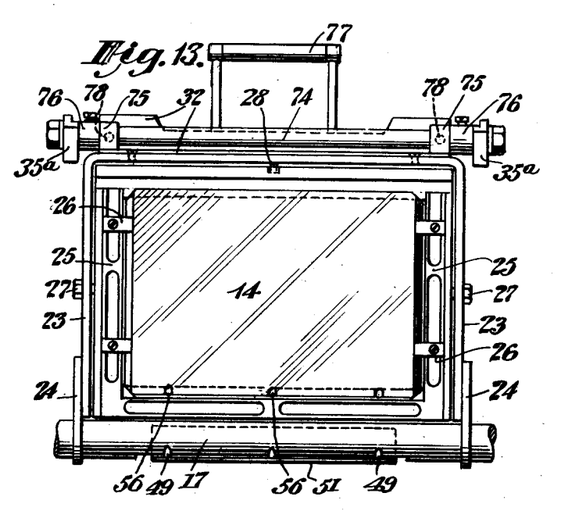
Fig. 13 an under face view of the presser plate and its supporting frames equipped with a modified clamping means.
Figure 14:
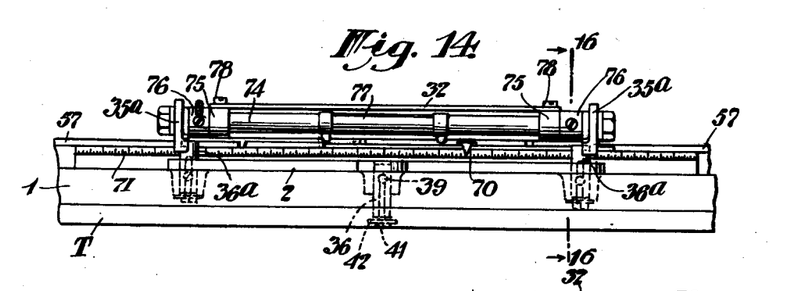
Fig. 14 a front view showing the presser plate clamped down by said modified clamping means.
Figure 15:
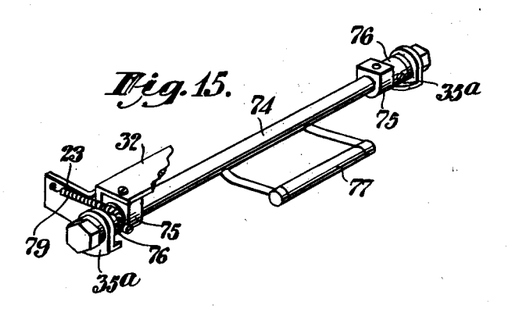
Fig. 15 a detail perspective view of said clamping means and part of its mounting.
Figure 16:
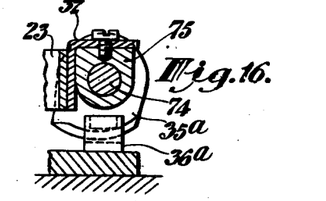
Fig. 16 an enlarged detail section taken on the line 16—16 of Fig. 14.

At its free end frame 23 is provided with clamping means for pressing and holding the presser plate 14 against picture sheets supported by the platen pad 8. For supporting said clamping means, frame 23 is provided with a pair of forwardly converging arms 29. These are detachably and firmly secured to the frame by bolting them to opposite sides of the frame as at 30, and by bolting them as at 31 to the under side of an angle iron 32 extending along the front of the frame and rigidly secured thereto. At their forward ends the arms 29 terminate in forwardly bent ears which are apertured to form bearings for a short rock shaft 33. Fixed to said rock shaft is a bail-like handle 34 and fixed to the shaft, within the handle, is a cam 35 which is rocked by swinging the handle. Said cam is formed with a cam lip defining a spiral arc, for engagement with a keeper pin 36 mounted in the casting 2. The latter is formed near its front edge with a boss 37 which projects downward through an opening in the base 1 and is formed with a vertical bore in which the pin 36 is slidably fitted. At its upper end the pin is transversely notched and formed with a lip 38 to be engaged by the cam lip. A set screw 39 is screwed into the boss 37 at a point below the top surface of the base 1 and engages a longitudinal keyway 40 in the pin. Said set screw prevents the pin from turning, serves to hold it in an elevated operative position, and limits its drop to an inoperative position below the upper surface of the casting 2, as shown in Fig. 9. A stop screw 41 is threaded upward into the lower end of the keeper pin and is provided with a washer 42 to abut the lower end of the boss. By turning this screw operative positioning of the pin may be adjusted with relation to the cam to vary the clamping effect of the latter.

A spring 43 is anchored to the angle iron 32 and to the rock shaft 33 and tends to swing when the presser plate is swung down, but will be positioned to enter the notch in the pin. Stops 44, one upon the rock shaft and the other upon one of the shaft-supporting arms 29, limit the rearward swing of the handle under the influence of the spring.

Figure 1:
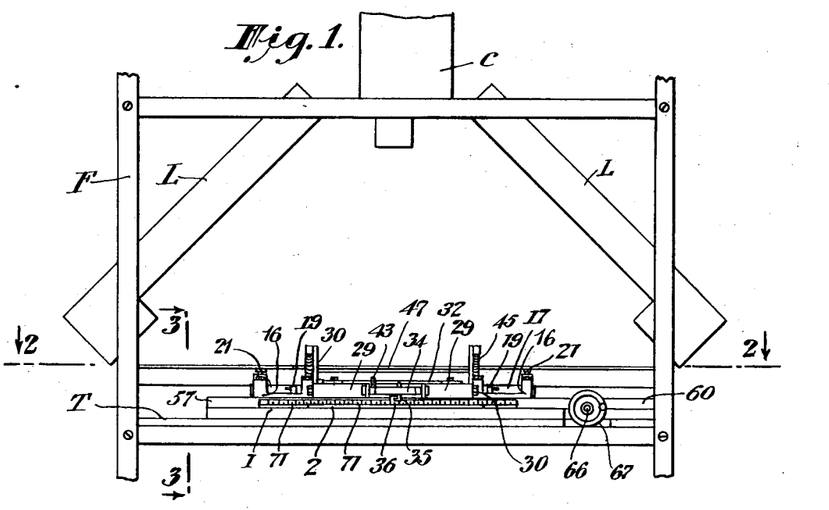
Fig. 1 is a front elevation of a photographing apparatus embodying my invention.
Figure 2:
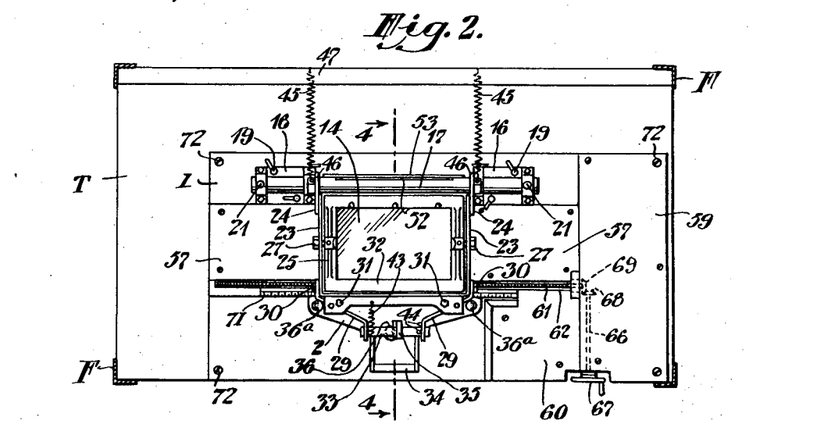
Fig. 2 a horizontal section taken on the line 2—2 of Fig. 1 showing the platen device in plan.
Figure 3:
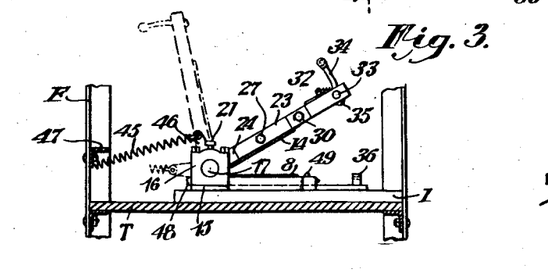
Fig. 3 a vertical section taken on the line 3—3 of Fig. 1 with the presser plate for flattening the picture sheets elevated.
Figure 4:
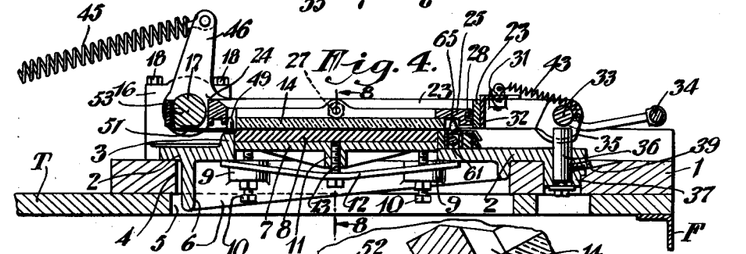
Fig. 4 a vertical section taken on the line 4—4 of Fig. 2, upon a larger scale.
Figure 5:
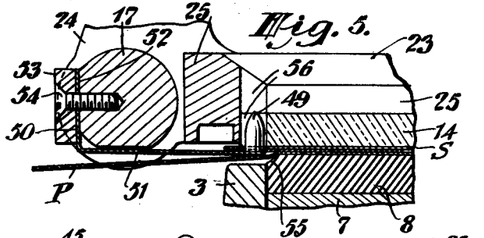
Fig. 5 a fragmentary sectional view, upon a still larger scale, of certain of the details of Fig. 4.
Figure 6:
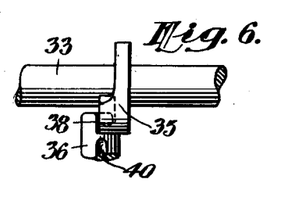
Fig. 6 a detail front view of part of the clamping means for forcing the presser plate against the supported sheets.

A pair of strong counter-balance springs 45 tend to hold the presser plate 14 and its supporting frames swung back, as shown by dotted lines in Fig. 3. For the connection of said springs to the presser means the hinge plates 24 of the outer frame 23 are formed with arms 46 extending approximately at right angles from the frame. At their forward ends the springs are connected to said arms and at their rear ends they are anchored to a horizontal angle iron 47 forming part of the frame structure of the camera stand and elevated above the table T. Stops 48 are mounted upon the shaft-supporting blocks 16 to contact the arms 46 and limit rearward swinging of the presser means.

At the rear edge of the platen pad 8, retaining means are provided for holding picture sheets A accurately positioned upon the pad for exposure of their pictures through the presser plate 14. The sheet-retaining means comprises upstanding pointed pins 49, three in the present instance, which are formed and positioned to accurately fit in apertures accurately formed and located in the picture sheets. There is a yieldable support for these pins in the form of a thin, resilient sheet of metal bent into an angular form to produce an upstanding attaching flange 50 and a forwardly extending flat shelf 51. At its rear side, the shaft 17 is flattened to form a seat 52 for the attaching flange 50 and the latter is held firmly clamped to said seat by a retaining strip 53 which is fastened to the shaft by screws 54. Thereby the shelf 51 is supported in a plane substantially parallel to the plane of the upper surface of the platen pad and closely adjacent thereto. The retaining pins are located at the forward edge of the shelf and said edge is directly over the rear edge of the platen pad. This edge of the pad is beveled, as at 55, to provide clearance for the passage of a long picture sheet beneath the shelf. The purpose of so mounting the retaining pins to provide under clearance for long picture sheets will appear hereinafter. To provide clearance for the pointed ends of the pins, projecting above the picture sheets, the glass plate 14 and its frame 25 are notched as at 56.

At opposite sides of the platen frame 3 a pair of plates 57 are mounted upon and secured to the base 1. These plates have flat upper surfaces substantially flush with the upper surface of the platen pad and they form supports for picture sheets which extend beyond the platen. Preferably said plates are made of wood which is penetrable by thumb tacks for fastening guide strips, indicated at 58, for guiding the extending sheets. There are also additional wooden plates 59 and 60 mounted and secured upon the base 1, near the right hand end of the latter and flush with the plates 57.

A long, slender feed screw 61 is rotatably mounted directly in front of the platen frame 3 and extends parallel with the shaft 17 approximately the full length of the platen and the flush wooden plates 57. Said screw is disposed below the level of the platen and plates 57, within a slot 62 whose sides serve as guides for nuts 63 mounted upon the screw and supporting an elongated plate 64. This plate is substantially flush with the platen and bears three upstanding sheet-retaining pins 65 spaced similarly to pins 49 and adapted to enter apertures of a picture sheet, for holding the latter and feeding it transversely across the platen. The feed screw is turned by driving means including a shaft 66 mounted upon the platen base 1 below the level of the plates 59 and 60 and extending from the screw, forward to the edge of the base. A hand wheel 67 is fixed to the forward end of said shaft and upon the rear end thereof is fixed a bevel gear 68 which meshes with a bevel gear 69 fixed to the screw. The travel of the plate 64 and its connected picture sheet is indicated by a pointer 70 fixed to said plate and disposed to travel along a scale 71 mounted in front of the screw.

It is common practice in the production of an animated picture series to execute background pictures upon opaque paper sheets and to execute the moving elements of the picture upon sheets of transparent celluloid. For photographing, the celluloid sheets are superposed, one or more at a time, upon an opaque sheet and photographed in the proper sequence. Usually the celluloid sheets become warped and crinkled. This condition becomes particularly bad when the sheets, as is customary, are washed and used repeatedly for new pictures. The flattening of such sheets for photographing has heretofore been very difficult, requiring great manual force which must be exerted thousands of times in the course of exposing a film. Failure to flatten the sheets sufficiently causes high light reffection and picture distortion which mars the photography and becomes very objectionable in the projected picture. The present platen device enables the sheets to be flattened much more completely and with a minimum of effort on the part of the operator.

The platen device is placed upon the table T and adjusted edgewise as a unit, to properly position the platen with relation to the camera lens, and is then fastened to the table by screws 72. One or more picture sheets to be photographed are then placed upon the platen pad; the presser lid is swung down to engage the plate 14 with the picture sheets, and the handle 34 is swung down to operate the cam for pressing the plate against the sheets and flattening the latter against the pad. The cam 35, when the pin 36 is properly adjusted, causes a powerful pressure upon the sheets for flattening them. When the plane of the platen has been carefully adjusted with relation to the presser plate, by means of the supporting screws 10, an even distribution of the pressure over the entire picture area is ensured by the mounting of the presser plate which permits it to rock about a medial axis. The mechanical advantage of the cam together with the provision for uniform pressure distribution enables an operator to obtain uniformly good results with little effort and care.

Standard picture sheets are of substantially the same area as the plate pad. Often, however, it is advantageous to employ long panorama sheets and to feed them across the platen, step by step, for successive exposures. By ingenious manipulation of such sheets an enormous amount of labor can be saved, in the execution of drawings, and many desired pictorial effects can be easily obtained. The present device has been designed for more free manipulation of such sheets. As shown in Figs. 5, 7, 8 and 9, a panorama sheet P may be passed freely beneath the shelf 51 which supports the retaining pins for the standard sheets, and beneath the hinge shaft 17, and has ample clearance. When the sheet is positioned for an exposure the presser plate is pressed down and the sheet is flattened, along with any sheets S which may be superposed upon it. The depression of the plate also depresses the resilient shelf 51 along with the sheets S, as the notched margin of the plate bears upon the apertured pin-engaging margins of the sheets. Beneath the shelf 51 there is ample clearance provided for the panorama sheet P to avoid injuring it. When the presser plate is lifted the resilient shelf springs back to normal position.

When it is required to dispose the panorama sheet obliquely, as shown in Fig. 8, the right hand shaft-supporting block 16 is released and withdrawn from the shaft to provide clearance for the sheet. The latter may be guided obliquely by the guide strip 58. In Fig. 9 the panorama sheet is shown in another oblique position with the right hand shaft-supporting block in position and the left hand block removed to provide clearance for the sheet. The shaft is strong and stiff and either of the blocks 16 is alone capable of supporting the shaft and the hinged presser means. This shiftability of either of the blocks 16 out of the way enables panorama sheets to be conveniently manipulated to obtain desired pictorial effects. The keeper pin 36 may be lowered out of the way of the panorama sheet by loosening the set screw 39 and permitting the pin to drop.

Also, the traveling plate 64 will be shifted to move the pins 65 out of the way. A panorama sheet which is required to travel straight across the platen may be provided with apertures for engagement with the pins of the traveling plate. It may then be fed across the plate by turning the hand wheel. The frame 25 is formed at its under side to provide clearance for the pins 65.

In Figs. 13 to 16 inclusive, a modification of the clamping means is shown providing for compression of the presser frame 23 at its two forward corners. Upon some occasions this may be desirable. This clamping means includes a long rock shaft 74 rotatably mounted in bearing blocks 75 spaced inwardly from its ends. Upon the ends of the shaft are fixed two clamping cams 35$^a$ similar to the cams 35, and, between said cams and the bearing blocks, two spacing sleeves 76 are fixed to the shaft. An operating handle 77 is fixed to the shaft, between the bearing blocks 75. For the mounting of this clamping device the arms 29, and their supported central clamping device previously described, are omitted or detached from the frame 23 and the bearing blocks 75 are fitted within the angle iron 32 and attached to it by screws 78. The cams 35$^a$ are then disposed for engagement with keeper pins 36$^a$ similar to pins 36 and similarly mounted in the flat front portion of the casting 2 at points near the front corners of the platen. A spring 79 is anchored to the frame 23 and to one of the spacing sleeves 76 and tends to rock the shaft and swing the cams forward and the handle rearward. Rearward movement of the handle is limited by contact with the angle iron 32. When the central clamp 35 and the pin 36 are employed the pins 36$^a$ are released by their set screws and permitted to shift down out of the way. The pins 36$^a$ and clamping cams engageable therewith are laterally spaced apart sufficiently to provide ample clearance therebetween for a picture sheet extending straight fore-and-aft beyond the limits of the platen. At the rear of the pad ample clearance is provided for said sheet, between the outwardly spaced shaft-supporting blocks 16.

What I claim is:

1. A device for supporting pictures for photographing them, comprising a flat support for picture sheets; a transparent presser plate to flatten the picture sheets upon said support; a frame supporting said plate; a hinge mounting for said frame adapting the frame and presser plate to swing to and from the picture sheet support; a pair of supports for said hinge mounting spaced along the hinge axis, said supports being independently removable and each capable of supporting the hinge mounting alone, and the removal of either support providing clearance beneath the hinge axis for picture sheets extending beyond the boundary of the presser plate.

2. A device for supporting pictures for photographing them, comprising a flat support for picture sheets; a transparent presser plate to flatten picture sheets upon said support; a frame supporting said plate; a hinge mounting for said frame adapting the frame and presser plate to swing to and from the picture support and comprising a stiff shaft and a hinge connection between the frame and said shaft; and a pair of supports for said shaft spaced materially along the shaft, independently removable and each capable of supporting the shaft alone, the removal of either shaft support providing clearance beneath a portion of the shaft for picture sheets extending beyond the boundary of the presser plate.

3. A device for supporting pictures for photographing them, comprising a flat support for picture sheets; a transparent presser plate to flatten picture sheets upon said support; a frame supporting said plate; a hinge mounting for said frame adapting the frame and presser plate to swing to and from the picture support and comprising a stiff shaft and a hinge connection between the frame and said shaft; a pair of supports for said shaft spaced materially along the shaft, independently removable and each capable of supporting the shaft alone, the removal of either shaft support providing clearance beneath a portion of the shaft for picture sheets extending beyond the boundary of the presser plate; retaining means to hold picture sheets properly positioned upon the picture sheet support; and a support for said retaining means mounted upon the shaft and formed and disposed to provide under clearance for said extending sheets.

4. A device for supporting pictures for photographing them, comprising a flat support for picture sheets; a transparent presser plate to flatten picture sheets upon said support; a frame supporting said plate; a hinge mounting for said frame adapting the frame and presser plate to swing to and from the picture support and comprising a stiff shaft, and a hinge connection between the frame and said shaft; a support for one end of said shaft capable of supporting the shaft alone, whereby clearance will be provided beneath the shaft beyond its support, for picture sheets extending beyond the presser plate; retaining means to hold picture sheets properly positioned upon the picture sheet support; and a support for said retaining means mounted upon the shaft and formed and disposed to provide under clearance for said extending sheets.

5. A device for supporting pictures for photographing them, comprising a flat, compressible support for picture sheets; a transparent presser plate to flatten the picture sheets upon said support for photographing them through the plate; a mounting for the plate adapting it to shift to and from the picture sheet support; sheet-retaining means to prevent edgewise displacement of the picture sheets and hold them properly positioned upon the support; and a flexible, resilient support for said retaining means formed and disposed to provide clearance therebeneath for sheets extending beyond the picture sheet support, said retaining means support being depressible by a margin of the presser plate along with the retained sheets.

6. A device of the class set forth, comprising a flat, compressible support for picture sheets; a transparent presser plate to flatten the picture sheets upon said support for photographing the pictures through the plate; a hinge mounting for one end of the plate adapting the plate to swing to and from the picture sheet support and including a fixed bar extending along one edge of the sheet support; a flat, thin, flexible and resilient shelf mounted upon said bar and extending along the adjacent edge of the picture sheet support; and upstanding sheet-retaining pins carried by said shelf and engageable with picture sheets upon the support to hold the sheets properly positioned, said shelf and bar being disposed to provide clearance therebeneath for picture sheets extending beyond the adjacent edge of the support and the shelf being depressible by a margin of the presser plate along with the retained sheets.

7. A device of the class set forth, comprising a flat, compressible support for picture sheets; a transparent presser plate to flatten the picture sheets upon said support for photographing the pictures through the plate; a hinge mounting for one end of the plate adapting the plate to swing to and from the picture sheet support and including a strong, stiff shaft extending along one edge of the sheet support and held against rotation; a flexible and resilient shelf mounted upon said shaft and extending along the adjacent edge of the picture sheet support; upstanding sheet-retaining pins carried by said shelf and engageable with picture sheets upon the support to hold the sheets properly positioned, said shelf and shaft being disposed to provide clearance therebeneath for picture sheets extending beyond the adjacent edge of the support and the shelf being depressible by a margin of the presser plate along with the retained sheets; and a pair of supports for said shaft mounted materially spaced along the shaft for independent removal to provide clearance for the extending sheets and each capable of alone supporting the shaft and hinged presser plate.

8. A device for supporting pictures for photographing them, comprising a flat, compressible support for picture sheets; a transparent presser plate for flattening the sheets upon the support for photographing them through the plate; a frame supporting said plate; a hinge mounting for said frame adapting the frame and plate to swing to and from the picture sheet support and including a strong, stiff, fixed bar extending along one edge of the sheet support; means supporting said bar in a position to provide clearance beneath it for sheets extending beyond the picture sheet support; a pivotal connection between the frame and the plate having an axis parallel to the hinge axis and medial with respect to the plate for equalizing the pressure of the plate upon the supported sheets; means to adjust the plane of the sheet support with relation to the plate; a handle mounted upon the opposite end of the frame from said hinged connection for shifting relatively to the frame; cam clamping means operable by relative shifting of said handle to press and hold the plate against the supported sheets; a spring tending to resist clamping operation of said handle; a spring tending to swing the frame and plate away from the sheet support; sheet-retaining means to hold picture sheets in proper position upon the sheet support; and a flexible and resilient support for said retaining means mounted upon said bar, depressible by a margin of the plate along with the supported sheets and disposed to provide clearance therebeneath for said extending sheets.

9. A device for supporting pictures for photographing them, comprising a compressible support for picture sheets; a transparent presser plate for flattening the sheets upon the support for photographing them through the plate; a frame supporting said plate; a hinge mounting for said frame adapting the frame and plate to swing to and from the picture sheet support and including a strong, stiff, fixed bar extending along one edge of the sheet support; means supporting said bar in a position to provide clearance beneath it for sheets extending beyond the picture sheet support; a pivotal connection between the frame and the plate having an axis parallel to the hinge axis and medial with respect to the plate for equalizing the pressure of the plate upon the supported sheets; manually operable cam clamping means to press and hold the plate against the supported sheets; sheet-retaining means to hold picture sheets in proper position upon the sheet support; and a flexible and a resilient support for said retaining means mounted upon said bar, depressible by a margin of the plate along with the supported sheets and disposed to provide clearance therebeneath for said extending sheets.

10. A device for supporting pictures for photographing them, comprising a flat support for picture sheets; a presser plate for flattening the picture sheets upon said support for photographing the pictures; a mounting for said plate supporting it for shifting to and from said support; spaced, adjustable supporting posts for said support, said posts being individually adjustable for tiltably adjusting the support into accurate sheet-compressing relation to the presser plate; and spring means yieldably holding the support upon said posts.

11. A device for supporting pictures for photographing them, comprising a flat support for picture sheets; a transparent presser plate for flattening the picture sheets upon said support for photographing the pictures through said plate; a hinge mounting for said plate supporting it for shifting to and from said support; four supporting posts for said support at the corners of the latter, said posts being individually adjustable for tiltably adjusting the support into accurate sheet-compressing relation to the presser plate; and spring means yieldably holding the support upon said posts.

12. A device for supporting pictures for photographing them, comprising a flat support for picture sheets; a presser plate to flatten the picture sheets upon said support for photographing the pictures; a mounting for said plate adapting it to shift to and from the picture sheet support; sheet-retaining means to prevent edgewise displacement of the picture sheets and hold them in position upon the support; and a flexible support for said retaining means adapted to provide clearance therebeneath for sheets extending beyond the picture sheet support, said retaining means support being depressible by a margin of the presser plate along with the retained sheets.

13. A device of the class set forth, comprising a flat, compressible support for picture sheets; a transparent presser plate to flatten the picture sheets upon said support for photographing the pictures through the plate; a hinge mounting for the plate adapting the plate to swing to and from the picture sheet support; a flat, thin, flexible and resilient shelf extending along one edge of the picture sheet support; upstanding sheet-retaining pins carried by said shelf and engageable with picture sheets upon the support to hold the sheets properly positioned; and means supporting said shelf to provide clearance therebeneath for picture sheets extending beyond the adjacent edge of the support, the shelf being depressible by a margin of the presser plate and along with the retained sheets.

14. A device of the class set forth, comprising a flat support for picture sheets; a presser plate to flatten the picture sheets upon said support; a hinge mounting for said plate adapting the plate to swing toward and from the sheet support; a pair of supports for said hinge mounting spaced along the hinge axis; and releasable fastening means holding said supports in operative position, the supports being independently removable and each capable of supporting the hinge mounting alone, and the removal of either support providing clearance beneath the hinge axis for picture sheets extending beyond the boundary of the presser plate.

15. A device of the class set forth, comprising a flat support for picture sheets; a presser plate to flatten the picture sheets upon said support; a hinge mounting for said plate adapting the plate to swing toward and from the sheet support; a pair of supports for said hinge mounting spaced along the hinge axis; releasable fastening means holding said supports in operative position, the supports being independently removable and each capable of supporting the hinge mounting alone, and the removal of either support providing clearance beneath the hinge axis for picture sheets extending beyond the boundary of the presser plate; and a flat auxiliary picture sheet support adjacent the first support and substantially flush with it for supporting the extending sheets, said auxiliary support being penetrable by thumb tacks for the attachment of guides for said extending sheets.

16. A device for supporting pictures for photographing them, comprising a flat support for picture sheets; a transparent presser plate to flatten the picture sheets upon said support for photographing the pictures through said plate; a hinge mounting for said plate at one end thereof adapting the plate to swing toward and from the sheet support; and a pair of supports for said hinge mounting spaced along the hinge axis and shiftable relatively to each other from normal position to provide clearance beneath the hinge axis for picture sheets to extend beyond the boundary of the presser plate and through the normal positions of said supports.

17. A device of the class set forth comprising a flat support for picture sheets; presser means to flatten the picture sheets against said flat support; a plurality of upstanding sheet-retaining pins engageable with picture sheets upon the support to hold them properly positioned; and means supporting said pins spaced along one edge of said flat support and laterally offset from said edge, said pin-supporting means being spaced from said edge of the flat support and having under-clearance for sheets on the support extending beyond said edge.

18. A device for supporting pictures for photographing them, comprising a flat compressible and resilient support for picture sheets; a transparent presser plate for flattening the sheets upon the support for photographing the pictures through said plate; a carrier frame for said plate hinged for swinging the plate to and from the picture sheet support and pressing it against the supported sheets; a mounting for said plate tiltably supporting it in the frame to equalize the pressure of the plate upon the picture sheets; manually operable means for tiltably adjusting the picture sheet support into accurate sheet-compressing relation to the presser plate; a handle mounted on the frame to shift relatively thereto; and cam clamping means operable by shifting of said handle relatively to the frame to press and hold the presser plate against the supported sheets.

19. A device for supporting pictures for photographing them, comprising a flat compressible and resilient support for picture sheets; a transparent presser plate for flattening the sheets upon the support for photographing the pictures through said plate; a carrier frame for said plate hinged for swinging the plate to and from the picture sheet support and pressing it against the supported sheets; a mounting for said plate tiltably supporting it in the frame to equalize the pressure of the plate upon the picture sheets; manually operable means for tiltably adjusting the picture sheet support into accurate sheet-compressing relation to the presser plate; a locking member pivotally carried by said frame and having an arcuate locking cam eccentric with relation to the pivot of the locking member; a keeper lockably engageable by said cam, the keeper and cam being cooperable to press and hold the presser plate against the supported sheets when the locking member is rocked in one direction; means rendering the keeper adjustable with relation to the locking member to bring it into accurate cooperative relation thereto; and a rockable handle carried by the frame and operable to swing the frame and rock the locking member.

GEORGE LANE.